Dec. 11, 1928.

J. VOLCKHAUSEN 1,694,459

RIM NUT

Original Filed Jan. 7, 1925

INVENTOR
Julius Volckhausen,

By Attorneys,

Fraser, Myers & Manley

Patented Dec. 11, 1928.

1,694,459

UNITED STATES PATENT OFFICE.

JULIUS VOLCKHAUSEN, OF WEEHAWKEN, NEW JERSEY, ASSIGNOR TO A. SCHRADER'S SON, INC., OF BROOKLYN, NEW YORK, A CORPORATION OF NEW YORK.

RIM NUT.

Application filed January 7, 1925, Serial No. 1,029. Renewed October 4, 1926

This invention relates to nuts and aims to provide certain improvements therein. More specifically, it relates to rim nuts for use in connection with pneumatic tire valves for engaging a wheel rim or felloe to hold the valve casing stationary and centered at all times. As heretofore made, it has been customary to form the underside of the rim nut with a recess into which was placed a leather washer which normally projected beyond the lower face of the nut to provide a frictional engaging surface for the nut. And when the nut was screwed onto a valve casing and forced against a rim or felloe, the frictional engagement between the washer and felloe was relied upon to prevent relative movement between the valve casing and felloe.

With the advent of the disk wheel, together with its metallic rim and felloe and its enlarged opening for the valve casing, it was found that the conventional rim nut did not effectively hold the valve casing against movement, and when such movement did occur, chafing of the inner tube would ensue, and furthermore, when such movement was sudden, there was danger of shearing the valve casing upon its being thrust against the metallic rim.

According to the present invention, I provide a rim nut which will positively hold the valve casing against movement and maintain it centered at all times, and which will prevent engagement between the rim or felloe and the valve casing. This I accomplish by forming the rim nut, which is preferably made from sheet metal, with an axial extension having a tapered bearing surface adapted to enter the valve casing opening in the rim or felloe and seat against the periphery of said opening. The invention also includes other features of novelty which will be hereinafter more fully described.

In the accompanying drawings wherein I have shown the preferred embodiment of my invention:

Figure 1:
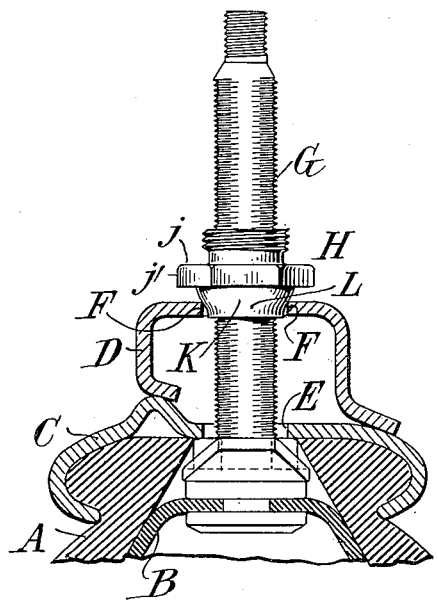
Figure 1 is a transverse section of a tire and rim with my invention applied thereto.

Referring to the drawings, let A indicate a portion of a tire casing or shoe within which is positioned a pneumatic inner tube B, the casing and tube being mounted upon a rim C and felloe D. Attached to the inner tube B and extending through openings E and F in the rim and felloe respectively is a conventional externally-threaded valve casing G, which is of somewhat smaller diameter than the openings E and F. In order to maintain the valve casing G stationary and to prevent creeping of the tire on the rim, there is provided a rim nut H.

According to the present invention, this rim nut H is of special construction and is preferably formed entirely of sheet metal. As herein shown, the rim nut H consists of two parts J and K, each formed with a body portion and a tubular extension. In part J, the body portion is formed by a substantially plane portion or lateral flange $j$ and axial flange $j'$ and the tubular extension is internally-threaded to engage the threads on the valve stem and externally-threaded to accommodate a dust cap. In part K, the body portion is formed by a substantially plane portion or lateral flange $k$ and an axial flange $k'$ and the tubular extension L which is tapered inwardly to provide a substantially conical bearing surface. The function of this tapered bearing surface on the tubular extension L is to enable it, when the rim nut is screwed upon a valve casing, to enter the opening in the rim or felloe and seat against the peripheral edge of said opening to provide a bearing for the rim nut which will maintain the valve casing centered at all times, prevent creeping of the tire and also prevent engagement of the valve casing with the wheel rim or felloe. To aid in the accomplishment of this result, the smallest internal diameter of the tapered extension is only slightly larger than the diameter of the valve casing. Where the wheel rim or felloe is formed of metal, it will be appreciated that by preventing engagement between the casing and said rim or felloe, should the tire creep, the severe shearing strains which would be transmitted to the valve casing are wholly avoided.

Figure 2:
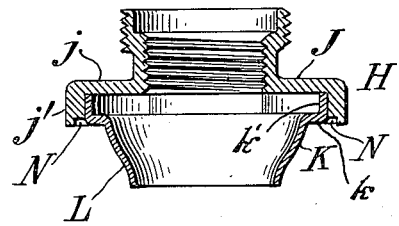
Fig. 2 is a transverse section of a rim nut embodying my invention.
Figure 3:
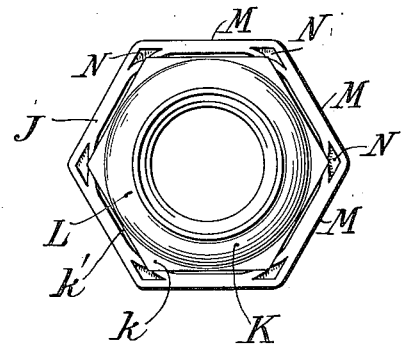
Fig. 3 is a bottom plan view of the nut shown in Fig. 2.

It will be obvious that the rim nut H as a whole may be of any preferred construction so long as it has the tapered bearing surface L or its equivalent. In the present construction I have elected to form the rim nut from the parts J and K arranged with their body portions seating one within the other, and their tubular extensions extending in opposite directions. I also preferably form the body portions of the nut parts of polygonal contour so as to avoid relative rotation between the nut parts and also to provide the nut with wrench engaging faces M. The parts J and K may be fitted together in any desired manner to normally prevent their separation, and, as herein shown, I accomplish this by upsetting portions of the inner corners on the underside of the flange j', as best shown at N in Figs. 2 and 3, so as to wedge the flanges j' and k' together.

While I have shown and described the preferred embodiment of my invention, it will be understood that the form disclosed is only illustrative of the inventive concept underlying the same, and it will therefore be obvious that various changes may be made therein without departing from the spirit of the invention.

What I claim is:

1. A sheet metal nut consisting of two parts, each having a body portion comprising a substantially plane portion and an outer peripheral axially-extending flange, and a tubular extension, the body portions of said parts being of similar polygonal contour and having their peripheral flanges fitting the one within the other and their plane portions in spaced relation to each other, one of said tubular extensions being tapered, and the other one being screw-threaded both internally and externally.

2. A nut comprising two parts of similar polygonal form, one of said parts being formed of sheet metal and having a flanged portion forming a recess within which the other polygonal part is fitted, and the inner faces of the flange at the corners thereof being struck up at the edges thereof to wedge the faces of said flange into engagement with the faces of the part to prevent separation of said parts.

3. A sheet-metal nut having a body portion and two independent axial extensions connected with the body portion and lying within the diameter of said body portion, one of said extensions having a reduced neck and an enlarged portion above said neck, said neck being internally screw-threaded and the enlarged portion being externally screw-threaded, and the other of said extensions having a large diameter where it joins said body portion, and a small diameter at its opposite end.

In witness whereof, I have hereunto signed my name.

JULIUS VOLCKHAUSEN.